United States Patent
Oh et al.

(10) Patent No.: US 8,495,393 B2
(45) Date of Patent: Jul. 23, 2013

(54) REMOTE POWER MANAGEMENT SYSTEM AND METHOD FOR CLUSTER SYSTEM

(75) Inventors: Soo Cheol Oh, Daejeon (KR); Seong Woon Kim, Gyeryong-si (KR); Han Namgoong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 681 days.

(21) Appl. No.: 12/507,403

(22) Filed: Jul. 22, 2009

(65) Prior Publication Data
US 2010/0162013 A1 Jun. 24, 2010

(30) Foreign Application Priority Data
Dec. 22, 2008 (KR) .................. 10-2008-0131750

(51) Int. Cl.
*G06F 9/50* (2006.01)

(52) U.S. Cl.
USPC ........... 713/300; 713/310; 713/320; 713/321; 713/322; 713/323; 713/324; 713/330; 713/340; 718/104; 709/226

(58) Field of Classification Search
USPC .. 713/300, 310, 320–324, 330, 340; 718/104; 709/226
See application file for complete search history.

(56) References Cited

U.S. PATENT DOCUMENTS

| | | | |
|---|---|---|---|
| 6,587,950 B1* | 7/2003 | Shah et al. | 713/300 |
| 7,051,215 B2 | 5/2006 | Zimmer et al. | |
| 7,370,362 B2* | 5/2008 | Olson et al. | 726/25 |
| 7,702,931 B2* | 4/2010 | Goodrum et al. | 713/300 |
| 2007/0300083 A1* | 12/2007 | Goodrum et al. | 713/300 |
| 2008/0178031 A1* | 7/2008 | Kim | 713/330 |
| 2010/0083010 A1* | 4/2010 | Kern et al. | 713/300 |
| 2010/0205471 A1* | 8/2010 | Vavilala et al. | 713/340 |

FOREIGN PATENT DOCUMENTS

| | | |
|---|---|---|
| JP | 05-088792 A | 4/1993 |
| JP | 07-226777 A | 8/1995 |
| JP | 09-091254 A | 4/1997 |
| JP | 10-312370 A | 11/1998 |
| JP | 2000-222082 A | 8/2000 |
| JP | 2001-142811 A | 5/2001 |
| JP | 2001-216119 A | 8/2001 |
| JP | 2007-011494 A | 1/2007 |
| JP | 2008-083841 A | 4/2008 |
| JP | 2008-305257 A | 12/2008 |
| KR | 1020060127120 A | 12/2006 |

* cited by examiner

*Primary Examiner* — M Elamin

(57) ABSTRACT

A remote power management technology for a cluster system of the present invention can monitor and control the power status of multiple hosts of the cluster system individually, thereby decreasing power consumption of the cluster system. A remote power management system includes a plurality of management nodes, a power proxy server, and a power management server. The management nodes, which manage power of the hosts of the cluster system respectively, are divided into groups. The power proxy server manages each group, monitors the power status of each management node of the group to generate proxy monitoring information, and transmits a power setting command to the management node of the specific host requiring power setting. The power management server monitors the power status of the hosts using the proxy monitoring information and transmits the power setting command to the power proxy server of the group including the management node of the specific host.

20 Claims, 6 Drawing Sheets

FIG 6

| POWER POLICY | TIME |
|---|---|
| PERFORMANCE | 00:00~08:30 |
| POWER SAVING MODE | 08:30~11:30 |
| USER SETTING MODE 1 | 11:30~15:00 |
| PERFORMANCE | 15:00~20:30 |
| USER SETTING MODE 2 | 20:30~24:00 |

REMOTE POWER MANAGEMENT SYSTEM AND METHOD FOR CLUSTER SYSTEM

CROSS-REFERENCE TO RELATED APPLICATIONS

This application claims priority under 35 U.S.C. §119 to Korean Patent Application No. 10-2008-131750, filed on Dec. 22, 2008, the disclosure of which is incorporated herein by reference in its entirety.

TECHNICAL FIELD

The present disclosure relates to a remote power management technology for hosts of a cluster system, and in particular, to a remote power management system and method for a cluster system, which divides multiple hosts of the cluster system into groups and monitors the cluster system by use of a power proxy server managing each of the groups, thereby making it possible to control power for each of the hosts.

BACKGROUND

A computer system includes various units and each of the units consumes considerable power. Therefore, many researches are being conducted to reduce the power consumption of the computer system.

A computer power management technology of the related art can only manage the hardware power for a single computer node, but cannot provide integrated power monitoring and control for multiple hosts of a cluster system.

SUMMARY

Accordingly, the present disclosure provides a remote power management system and method for a cluster system, which can monitor the power status of multiple hosts of the cluster system and set power for each of the hosts.

According to an aspect, a remote power management system for a cluster system is provided. The remote power management system includes a plurality of management nodes, a power proxy server, and a power management server. The management nodes are divided into a plurality of groups to respectively manage the power of a plurality of hosts constituting a cluster system. The power proxy server manages each group, monitors the power status of each management node of the group to generate proxy monitoring information, and transmits a power setting command to the management node of a specific host requiring power setting. The power management server monitors the power status of the hosts using each of the proxy monitoring information and transmits the power setting command to the power proxy server of the group including the management node of the specific host.

According to another aspect, a remote power management method using a power proxy server is provided. In the power management method, a host power status information request is transmitted to a plurality of management nodes respectively managing the power of a plurality of hosts. The power status of the hosts is received to generate proxy monitoring information. Generated proxy monitoring information is transmitted upon receiving a proxy monitoring information request from a power management server.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 6 is a diagram illustrating the power policy and power schedule of a power setting command according to an exemplary embodiment.

DETAILED DESCRIPTION OF EMBODIMENTS

Hereinafter, specific embodiments will be described in detail with reference to the accompanying drawings.

Figure 1:
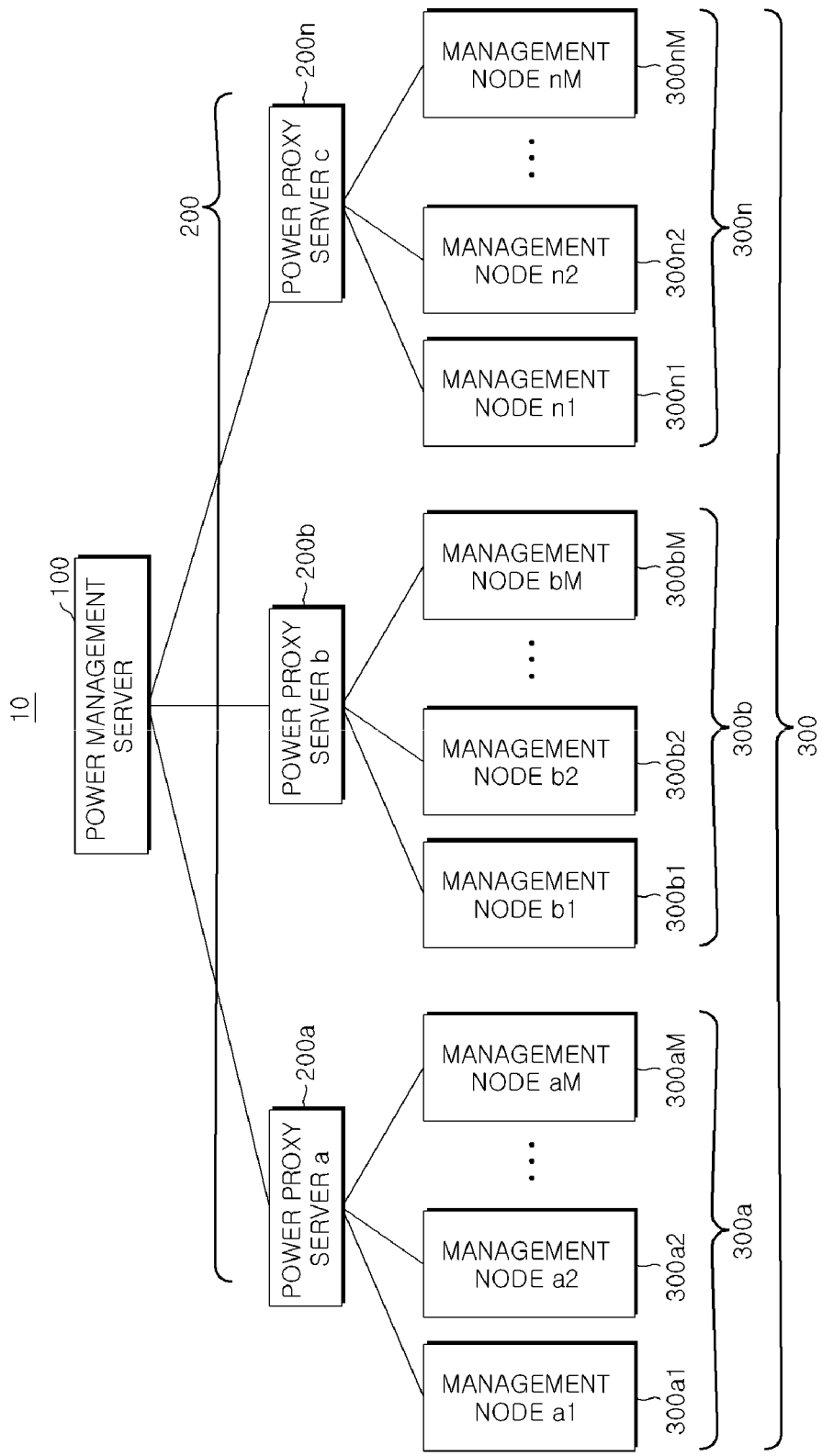
FIG. 1 is a block diagram of a cluster system according to an exemplary embodiment.

FIG. 1 is a block diagram of a remote power management system for a cluster system according to an exemplary embodiment of the present invention.

Referring to FIG. 1, a remote power management system 10 for a cluster system includes a plurality of management nodes 300, a plurality of power proxy servers 200, and a power management server 100. The management nodes 300 respectively manage the power of hosts of the cluster system. Each of the power proxy servers 200 monitors a group of the management nodes 300.

That is, the remote power management system 10 has a hierarchical structure, and a component of each level may include a plurality of sub-level components. The hierarchical structure enables the simple and efficient configuration of the power management server 100.

The management nodes 300 may be divided into a plurality of groups 300a, 300b, . . . , 300n, and each group may include a plurality of management nodes. For example, the group 300a may include management nodes 300a1, 300a2, . . . , 300aM. According to an exemplary embodiment, each group may include 256 management nodes 300.

Each group is managed by one power proxy server 200. Thus, the remote power management system 10 may include as many power proxy servers 200a, 200b, . . . , 200n as the number of the groups of the management nodes 300.

The power management server 100 may manage n power proxy servers 200a, 200b, . . . , 200n. Thus, the power management server 100 may manage or monitor the management nodes 300 through the power proxy servers 200.

Figure 2:
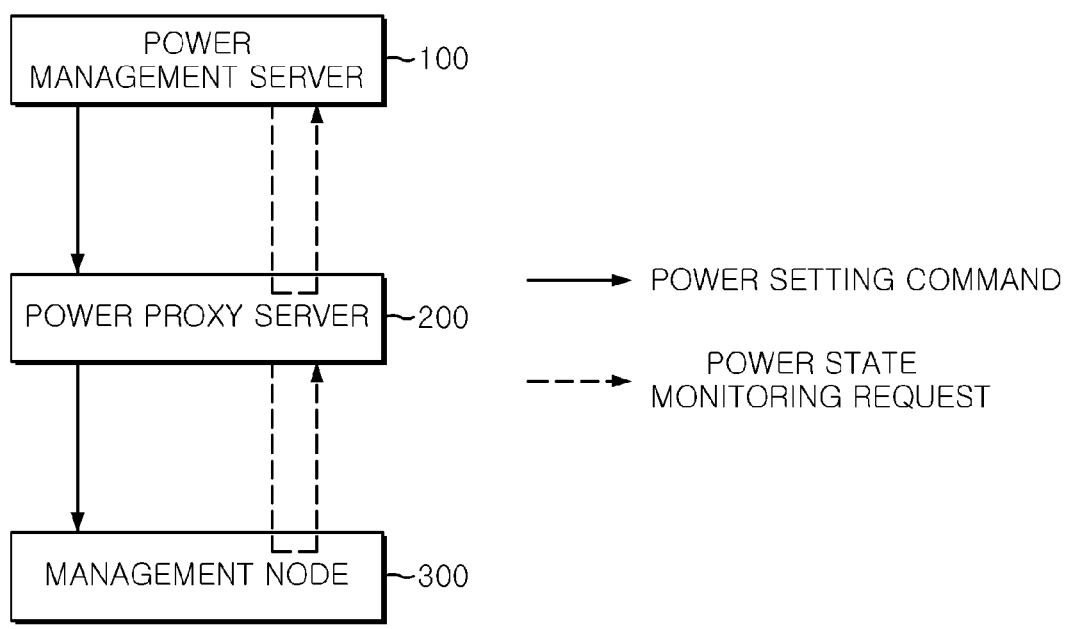
FIG. 2 is a diagram illustrating a command flow for power setting and power status monitoring according to an exemplary embodiment.

FIG. 2 is a diagram illustrating a command flow for power setting and power status monitoring according to an exemplary embodiment.

Referring to FIG. 2, a power setting command and a power status monitoring request may be transmitted through the hierarchical structure.

For power setting for a specific host, the power management server 100 may generate a power setting command for the specific host and transmit the generated power setting command to the management node 300 through the power proxy server 200 that manages the group including the management node 300 managing the specific host. To this end, the power management server 100 may retain information about the hierarchical structure of the remote power management system 10, such as information about the group of the management node 300 managing the specific host and information about the power proxy server 200 managing the group of the management node 300.

Upon receiving the power setting command from the power management server 100, the power proxy server 200 may detect the specific host or the management node 300 managing the specific host, which is listed in the received power setting command, to provide the received power setting command to the detected management node 300.

Also, for power status monitoring, the power proxy server 200 may make a power status monitoring request for each of the management nodes 300 managed by the power proxy server 200 itself and receive a response to the power status monitoring request to generate monitoring information (hereinafter referred to as proxy monitoring information). For this purpose, the power proxy server 200 may generate and retain the proxy monitoring information by periodically making the power status monitoring request for each of the management nodes 300 managed by the power proxy server 200 itself. Alternatively, the power proxy server 200 may generate the proxy monitoring information upon receiving a request from the power management server 100.

The power management server 100 may request a proxy monitoring information to get the power status of a specific host to the power proxy server 200 managing the group including the specific host, because the power proxy server 200 generates and retains the proxy monitoring information about the management nodes 300 of the group managed by the power proxy server 200.

Also, the power management server 100 may generate or retain the monitoring information about the entire cluster system by transmitting a proxy monitoring information request to the power proxy servers 200 periodically or upon user's request.

Hereinafter, with reference to FIGS. 3 to 5, a detailed description will be given of the components of the remote power management system 10 according to an exemplary embodiment.

Figure 3:
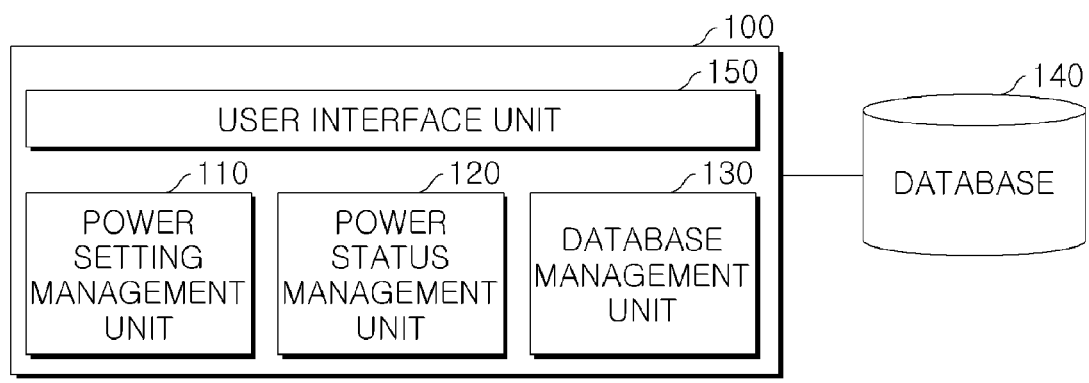
FIG. 3 is a block diagram of a power management server according to an exemplary embodiment.

FIG. 3 is a block diagram of the power management server 100 according to an exemplary embodiment.

Referring to FIG. 3, the power management server 100 includes a power setting management unit 110, a power status management unit 120, a database management unit 130, a database 140, and a user interface unit 150.

The power setting management unit 110 sets a power setting command to instruct the power setting for a specific host and transmit the power setting command to the power proxy server 200 that manages the group including the management node 300 managing the specific host.

Herein, the power setting command may be generated on the basis of user input or according to a predetermined policy, which will be described later in detail with reference to FIG. 6.

The power status management unit 120 requests a proxy monitoring information to the power proxy servers 200 and receives a response to the request to generate monitoring information about the power status of the cluster system. As described above, the power status management unit 120 may generate the monitoring information periodically or upon user's request.

The database 140 stores the monitoring information of the cluster system or a history thereof. To this end, the database management unit 130 provides the database 140 with the monitoring information of the cluster system generated by the power state management unit 120. Herein, the database management unit 130 may receive the periodically-regenerated monitoring information of the cluster system from the power status management unit 120 to mange the database 140.

The user interface unit 150 may provide the monitoring information of the cluster system to the user. Also, the user interface unit 150 may receive the user input for the power setting command and provide the received user input to the power setting management unit 110. The user interface unit 150 may provide a user interface based on the Web environment, and the user may use the Web-based user interface to detect the monitoring information of the cluster system or to execute the power setting command.

Figure 4:
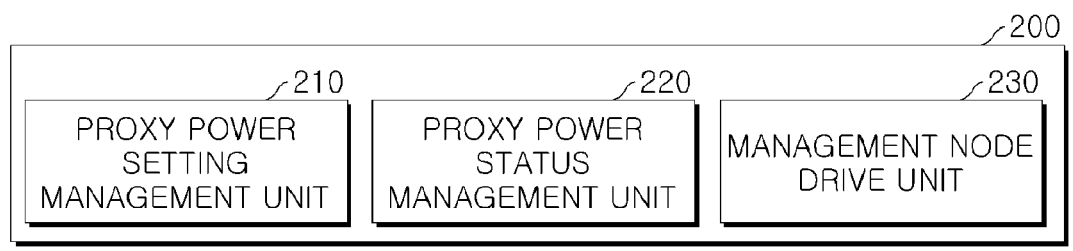
FIG. 4 is a block diagram of a power proxy server according to an exemplary embodiment.

FIG. 4 is a block diagram of the power proxy server 200 according to an exemplary embodiment.

Referring to FIG. 4, the power proxy server 200 includes a proxy power setting management unit 210, a proxy power status management unit 220, and a management node drive unit 230.

The proxy power setting management unit 210 receives a power setting command from the power management server 100 and transmits the power setting command to the management node 300 of the specific host to which the power setting command is to be applied. Herein, the specific host is a host that is included in the group managed by the power proxy server 200. In order to transmit the power setting command, the power proxy server 200 retains information on the hosts of the group managed by the power proxy server 200 or the management nodes 300 managing the respective hosts.

The proxy power status management unit 220 requests power status information on the host to each management node 300 of the group managed by the power proxy server 200 and receives a response to the request to generate the proxy monitoring information about the group. Also, the proxy power status management unit 220 may provide the generated proxy monitoring information to the power management server 100 upon receiving the proxy monitoring information request from the power management server 100.

Herein, the proxy power status management unit 220 may regenerate the proxy monitoring information by periodically transmitting the power status information request on the corresponding host to each management node 300 of the group managed by the power proxy server 200, or may generate the proxy monitoring information upon receiving a request from the power management server 100. Also, the proxy power status management unit 220 may store the proxy monitoring information and manage a history thereof.

The management node drive unit 230 controls the management node 300 to turn on a turned-off host or a unit thereof. Also, the management node drive unit 230 may control the management node 300 of a host to turn on the host at every predetermined time set by the power management server 100. Alternatively, the management node drive unit 230 may control the management node 300 of the host to turn on the host upon the request of the power management server 100.

Figure 5:
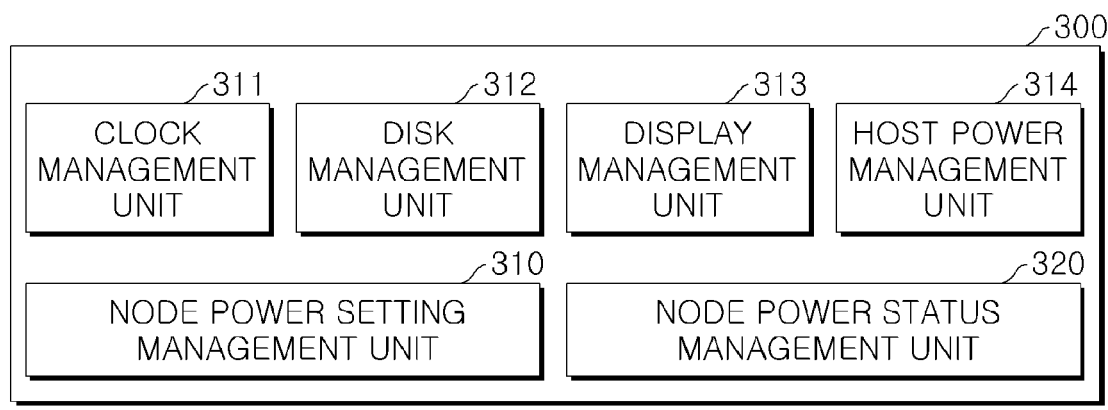
FIG. 5 is a block diagram of a management node according to an exemplary embodiment.

FIG. 5 is a block diagram of the management node 300 according to an exemplary embodiment.

The management node 300 manages the power of each unit of a host managed by the management node 300 itself. Also, the management node 300 detects the power status of each unit and provide it to the power proxy server 200.

For this purpose, referring to FIG. 5, the management node 300 may include a clock management unit 311, a disk management unit 312, a display management unit 313, a host power management unit 314, a node power setting management unit 310, and a node power status management unit 320.

The clock management unit 311 controls the clock of a central processing unit (CPU) to change the operation speed thereof according to the power setting command.

This is because the power consumption of the CPU decreases as the operation speed of the CPU operating in synchronization with the clock decreases. Also, power consumption decreases when the voltage decreases because the power goes as square of the voltage. The clock management unit 311 may use a Dynamic Voltage Scaling (DVS) technique to reduce the power consumption of the CPU by controlling the operation speed or voltage of the CPU.

The disk management unit 312 manages the power of a disk unit such as a hard disk. For example, the disk management unit 312 may control the hard disk to enter a sleep mode.

The display management unit 313 manages the power of a display unit. To this end, the display management unit 313 may control the output of a display card of a host to manage the power of the display unit.

The host power management unit 314 manages a power unit of a host. For example, the host power management unit 314 may control the host to enter a sleep or a hibernation mode.

The node power setting management unit 310 receives the power setting command from the power proxy server 200 and controls at least one of the clock management unit 311, the disk management unit 312, the display management unit 313 and the host power management unit 314 according to the received power setting command.

For the control operation, the node power setting management unit 310 may provide the power setting values of a CPU, a disk unit, a display unit, and a host power unit, which are included in the power setting command, to the clock management unit 311, the disk management unit 312, the display management unit 313 and the host power management unit 314, respectively.

The power setting values may be stored in a storage unit (e.g., a memory) of the management node 300, and their copies may be stored in a hard disk of the host. The copies stored in the hard disk can be used to perform the power setting of the management node 300 when the host restarts due to a system malfunction.

The clock management unit 311, the disk management unit 312, the display management unit 313, the host power management unit 314, and the node power setting management unit 310 may use an Advanced Configuration and Power Interface (ACPI) to control the power of each unit.

The ACPI is a power management standard developed jointly by Intel, Microsoft and Toshiba. The ACPI controls power provided for various units of a computer so that no power or a small amount of power is supplied to the unit that is not in use. To this end, the ACPI provides with an interface which defines the various power status of units of each computer and changes the power status of the respective units according to the system status. An operating system or an application program may use the ACPI to control the power consumption of each unit. Herein, an algorithm for determining the time to change each unit into a low-power mode or a normal operation mode may be determined by the operating system or the application program. In the present embodiment, the algorithm may be determined by the node power setting management unit 310.

The node power status management unit 320 reports the power status of at least one of the CPU, the disk unit, the display unit, and the host power unit of the host upon the request of the power proxy server 200.

Information about the power status of each unit reported by the node power status management unit 320 may include node status information, power policy information, DVS information, CPU operation speed information, disk status information, and/or display status information.

The node status information may include information about whether the host is turned on or off and information about whether the host is in a sleep mode or a hibernation mode.

The power policy information is the information about the power policy applied to the management node 300 of the host, which will be described later in detail with reference to FIG. 6.

The DVS information is the information about the DVS technique applied to the management node 300 of the host. The CPU operation speed information is the status information about the operation speed of the host CPU.

The disk status information is the information about whether the disk unit is in operation, sleep, or standby mode. The display status information is the information about whether the display unit is turned on or off.

Hereinafter, the power setting command will be described in detail with reference to FIG. 6.

FIG. 6 is a diagram illustrating the power policy and power schedule of the power setting command according to an exemplary embodiment.

Referring to FIG. 6, the power setting command may include information about a power policy and a power schedule.

The power policy supports a performance mode, a power saving mode, and a user setting (custom) mode.

The performance mode is set to maximize the performance of the host, and does not manage the power of the host. For example, the performance mode may set a rated voltage to maximize the performance of the CPU, and may not perform the power management (i.e., the power saving mode) of the disk unit, the display unit, and the host power unit, thereby maximizing the performance of the host.

The power saving mode may be set for each of the CPU, the disk unit, the display unit, and the host power unit.

Hereinafter, a detailed description will be given of power saving mode information (i.e., the power setting value) that can be set for each unit.

The power saving mode information of the CPU may include information about the use of a DVS technique, the type of a DVS manager, the operation frequency of the CPU, the upper threshold value, and the lower threshold value. For example, the DVS manager may have the status of performance, on-demand, or fixed, and the operation frequency of the CPU may be set if the DVS manager is set to be fixed. Also, if the DVS manager is set to be on-demand, the upper and lower threshold values may be set for the operation frequency of the CPU. The clock management unit 311 may use the power saving mode information of the CPU to manage the power of the host CPU.

The power saving mode information of the disk unit may include time-out information and sleep mode information. For example, if the hard disk does not operate for a predetermined time, the time-out information may be set to change the hard disk into a standby or a sleep mode. Also, the sleep mode information may include a post-time-out mode, e.g., a standby or sleep mode, which is the mode to be entered after the time-out. The disk management unit 312 may use the power saving mode information of the disk unit to set the power of the host disk drive.

The power saving mode information of the display unit may include time-out information that is used to set the display unit to be turned off if the display unit is not used for a predetermined time. The display management unit 313 may use the power saving mode information of the display unit to set the power of the display unit.

The power saving mode information of the host power unit may include time information, mode information, and system turn-on time information. For example, the time information may designate the time for the system to enter a sleep mode, in units of hour and minute. The mode information may designate the mode of the system to be entered, which is either a sleep mode or a hibernation mode. Also, the system turn-on time information may designate the time to turn on the host in a sleep or hibernation mode, in units of hour and minute. The host power management unit 314 may use the power saving mode information of the host power unit to set the power of the host power unit.

The user setting mode allows the user to set the power saving mode by freely changing the detailed power setting values of the respective units (i.e., the CPU, the disk unit, the display unit, and the host power unit) of the host. The user setting mode may be set in plurality.

The power setting values of the power saving mode and the performance mode are preset by the system and cannot be changed by the user.

FIG. 6 illustrates an exemplary power schedule. According to the exemplary power schedule, a performance mode policy is applied from 00:00 to 08:30; a power saving mode policy is applied from 08:30 to 11:30; and a first user setting mode policy is applied from 11:30 to 15:00. Thereafter, the performance mode policy is again applied from 15:00 to 20:30; and a second user setting mode policy is applied from 20:30 to 24:00.

In this way, the power schedule information may set the power policy information for the host differently depending on the predetermined time zones or intervals.

Hereinafter, a remote power management method according to an exemplary embodiment will be described in terms of the power proxy server 200.

For remote power management, the power proxy server 200 request a host power status information to the management nodes managing the power of the hosts and receives the host power status information to generate proxy monitoring information.

Also, the power proxy server 200 may transmit the generated proxy monitoring information upon receiving a proxy monitoring information request from the power management server 100.

Also, upon receiving a power setting command for a specific host from the power management server 100, the power proxy server 200 may transmit the power setting command to the management node 300 of the specific host.

Herein, the power setting command may include a power setting value for at least one of the CPU, the disk unit, the display unit, and the host power unit of the specific host.

More specifically, the power setting command may include at least one of performance mode information, power saving mode information, and user setting mode information. Herein, the performance mode information may be set to maximize the performance of the CPU, the disk unit, the display unit, and the host power unit of the specific host. The power saving mode information may be generated to set the power saving mode for at least one of the CPU, the disk unit, the display unit, and the host power unit. The user setting mode information may be generated to set the power saving mode for at least one of the CPU, the disk unit, the display unit, and the host power unit according to a value set by the user.

As described above, the present invention provides the monitoring information for the multiple hosts of the cluster system and sets the power for each of the hosts, thus making it possible to provide efficient power management for the cluster system.

Also, the present invention sets the power policy and schedule for each of the hosts to provide efficient power management for the cluster system, thereby making it possible to reduce the power consumption.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A remote power management system, comprising:
a plurality of management nodes divided into a plurality of node groups, each of the plurality of management nodes being configured to manage power of a corresponding one of a plurality of hosts included in a cluster system;
a plurality of power proxy servers, each power proxy server being configured to manage a corresponding one of the plurality of node groups, monitor a power status of a specific host that is managed by each management node included in the corresponding node group to generate proxy monitoring information, and transmit a power setting command to a management node of the specific host if the specific host requires power setting; and
a power management server configured to monitor a power status of the plurality of hosts using the proxy monitoring information generated by the plurality of power proxy servers, and transmit the power setting command to a first power proxy server coupled to the management node of the specific host,
wherein the power management server comprises:
a power setting management unit configured to set the power setting command and transmit the power setting command to the first power proxy server; and
a power status management unit configured to request the proxy monitoring information from the plurality of power proxy servers, receive a response to the proxy monitoring information request, and generate monitoring information of the cluster system based on the response.

2. The remote power management system of claim 1, wherein the power setting command comprises at least one of:
performance mode information to maximize a performance of the specific host;
power saving mode information to set a first power saving mode for at least one of a central processing unit (CPU), a disk unit, a display unit, and a host power unit of the specific host; and
user setting mode information to set a second power saving mode based on a user input.

3. The remote power management system of claim 2, wherein the power setting command further comprises power schedule information to set at least one of a performance mode, a power saving mode, and a user setting mode for a plurality of time zones.

4. The remote power management system of claim 1, wherein each of the plurality of power proxy servers comprises:

a proxy power setting management unit configured to receive the power setting command from the power management server and transmit the received power setting command to the management node of the specific host; and a proxy power status management unit configured to request power status information of the specific host from each management node of the corresponding node group managed by the first power proxy server, receive a response to the power status information request, and generate the proxy monitoring information for the corresponding node group based on the response.

5. The remote power management system of claim 4, wherein the power proxy server is configured to generate the proxy monitoring information by periodically requesting the power status information from each management node of the corresponding node group.

6. The remote power management system of claim 4, wherein the power proxy server further comprises a management node drive unit configured to control each management node to turn on a host that is in an off state.

7. The remote power management system of claim 6, wherein the management node drive unit is configured to control each management node to turn on the host in the off state at a time set by the power management server.

8. The remote power management system of claim 1, wherein the power management server further comprises a database management unit configured to manage the monitoring information of the cluster system in a database, and wherein the database management unit is configured to receive the monitoring information of the cluster system, which is periodically generated, from the power status management unit.

9. The remote power management system of claim 1, wherein the power management server further comprises a user interface unit configured to provide the monitoring information of the cluster system to a user, receive a user input for the power setting command, and provide the received user input to the power setting management unit.

10. The remote power management system of claim 1, wherein each of the plurality of management nodes comprises:
at least one of:
a clock management unit configured to control a clock of a CPU of the specific host to manage power of the specific host;
a disk management unit configured to manage power of a disk unit of the specific host;
a display management unit configured to manage power of a display unit of the specific host;
a host power management unit configured to manage a power unit of the specific host; and
a node power setting management unit configured to receive the power setting command and control at least one of the clock management unit, the disk management unit, the display management unit, and the host power management unit according to the received power setting command.

11. The remote power management system of claim 10, wherein each of the plurality of management nodes further comprises a node power status management unit configured to report a power status of at least one of the CPU, the disk unit, the display unit, and the power unit in response to a request from a corresponding power proxy server.

12. A remote power management method using a plurality of power proxy servers, the method comprising:

requesting, by a power proxy server, host power status information of a specific one of a plurality of hosts from a corresponding management node of a plurality of management nodes that respectively manage power of the plurality of hosts, the power proxy server being coupled to the plurality of management nodes;

receiving, by the power proxy server, the host power status information to generate proxy monitoring information;

transmitting, by the power proxy server, the proxy monitoring information, upon receiving a proxy monitoring information request from a power management server, to the power management server;

receiving, by the power proxy server, a power setting command for the specific host from the power management server if the specific host requires power setting; and transmitting, by the power proxy server, the power setting command to the management node of the specific host, wherein the plurality of power proxy servers is coupled to the power management server.

13. The remote power management method of claim 12, wherein the power setting command comprises a power setting value for at least one of a central processing unit (CPU), a disk unit, a display unit, and a host power unit of the specific host.

14. The remote power management method of claim 13, wherein the power setting command comprises at least one of:
performance mode information to maximize the performance of the CPU, the disk unit, the display unit, and the host power unit of the specific host;
power saving mode information to set a first power saving mode for at least one of the CPU, the disk unit, the display unit, and the host power unit of the specific host; and
user setting mode information to set a second power saving mode based on a user input.

15. A remote power management system comprising:
a plurality of management nodes divided into a plurality of node groups, each of the plurality of management nodes being configured to manage power of a corresponding one of a plurality of hosts constituting a cluster system;
a plurality of power proxy servers, each power proxy server being configured to manage a corresponding one of the plurality of node groups, monitor a power status of a specific host that is managed by each management node included in the corresponding node group to generate proxy monitoring information, and transmit a power setting command to a management node of the specific host if the specific host requires power setting; and
a power management server configured to monitor a power status of the plurality of hosts using the proxy monitoring information generated by the plurality of power proxy servers, and transmit the power setting command to a power proxy server coupled to the management node of the specific host,
wherein each of the plurality of power proxy servers comprises:
a proxy power setting management unit configured to receive the power setting command from the power management server and transmit the received power setting command to the management node of the specific host; and
a proxy power status management unit configured to request power status information of the specific host from each management node of the corresponding node group managed by the power proxy server, receive a response to the power status information request, and generate the proxy monitoring information for the corresponding node group based on the response.

16. The remote power management system of claim 15, wherein the power proxy server is configured to generate the proxy monitoring information by periodically requesting the power status information from each management node of the corresponding node group.

17. The remote power management system of claim 15, wherein the power proxy server further comprises a management node drive unit configured to control each management node to turn on a host that is in an off state at a time set by the power management server.

18. The remote power management system of claim 15, wherein the power management server comprises:
   a power setting management unit configured to set the power setting command and transmit the power setting command to the power proxy server coupled to the management node of the specific host; and
   a power status management unit configured to request the proxy monitoring information from the plurality of power proxy servers, receive a response to the proxy monitoring information request, and generate monitoring information of the cluster system based on the response.

19. The remote power management system of claim 18, wherein the power management server further comprises a database management unit configured to manage the monitoring information of the cluster system in a database, and wherein the database management unit is configured to receive the monitoring information of the cluster system, which is periodically generated, from the power status management unit.

20. The remote power management system of claim 18, wherein the power management server further comprises a user interface unit configured to provide the monitoring information of the cluster system to a user, receive a user input for the power setting command, and provide the received user input to the power setting management unit.

* * * * *